United States Patent
Cediel et al.

(10) Patent No.: US 6,994,209 B2
(45) Date of Patent: Feb. 7, 2006

(54) CONVEYOR BELT WITH A POLYMER SURFACE COATING CONTAINING AN ANTIMICROBIAL ADDITIVE

(75) Inventors: Luis E. Cediel, Wollerau (CH); Claudia Honold, Basel (CH); Kurt Brodmann, Ettingen (CH)

(73) Assignee: Habasit AG, Reinach (CH)

(*) Notice: Subject to any disclaimer, the term of this patent is extended or adjusted under 35 U.S.C. 154(b) by 0 days.

(21) Appl. No.: 10/470,883

(22) PCT Filed: Jan. 14, 2002

(86) PCT No.: PCT/CH02/00020

§ 371 (c)(1),
(2), (4) Date: Jul. 31, 2003

(87) PCT Pub. No.: WO02/062682

PCT Pub. Date: Aug. 15, 2002

(65) Prior Publication Data

US 2004/0065529 A1    Apr. 8, 2004

(30) Foreign Application Priority Data

Feb. 2, 2001  (CH)  .................................... 183/01

(51) Int. Cl.
*B65G 15/34*    (2006.01)

(52) U.S. Cl. .................................... 198/847

(58) Field of Classification Search ........... 198/847, 198/848, 850, 853, 851, 852

See application file for complete search history.

(56) References Cited

U.S. PATENT DOCUMENTS

| 5,495,935 | A | * | 3/1996 | Zabron et al. | ............... 198/847 |
| 5,697,491 | A |   | 12/1997 | Alex | |
| 5,906,269 | A | * | 5/1999 | Zabron et al. | ............... 198/847 |
| 6,039,964 | A | * | 3/2000 | Sanduja et al. | ............... 198/847 |

FOREIGN PATENT DOCUMENTS

| DE | 196 54 347 A1 | 6/1998 |
| EP | 0 818 405 A2 | 1/1998 |
| JP | 04 055207 A | 2/1992 |
| JP | 04 333406 | 11/1992 |
| JP | 04 333407 A | 11/1992 |
| JP | 05 310963 A | 11/1993 |
| JP | 07 331017 A | 12/1995 |
| JP | 09058834 | 3/1997 |
| JP | 2000016547 | 1/2000 |
| WO | WO 97/18148 | 5/1997 |

* cited by examiner

*Primary Examiner*—James R. Bidwell
(74) *Attorney, Agent, or Firm*—Hodgson Russ LLP

(57) ABSTRACT

A conveyor belt has a traction layer (3) in the form of a woven textile that is provided with a polymer surface coating. The surface coating is formed of a base layer (2) and a functional surface layer (1). The functional surface layer (1) has an antimicrobial additive and is substantially thinner than the base layer (2). The division of the surface coating into a base layer (2) and a functional surface layer (1) allows a effectiveness against microorganisms in the area of the conveying zone. This can be achieved by using either a lower amount of antimicrobial additive in the functional surface layer (1), being a less expensive process, and achieving just as high a concentration of antimicrobial additive. This can also be achieved by using the same amount of additive resulting in a substantially higher concentration and thus a higher effectiveness against microorganisms.

32 Claims, 1 Drawing Sheet

CONVEYOR BELT WITH A POLYMER SURFACE COATING CONTAINING AN ANTIMICROBIAL ADDITIVE

BACKGROUND

The present invention relates to a conveyor belt with a traction layer and with a polymer surface coating which comprises an antimicrobial additive, and also to a process for producing or repairing this conveyor belt.

Taking the example of conveyor belts used to transport foods, there is a risk that food constituents adhere to the surface of the belt and that microorganisms, e.g. microbes, bacteria, fungi, yeasts, viruses, etc., become established and may grow. These microorganisms impair the quality and durability of the transported food. They therefore have to be removed by frequent cleaning of the conveyor belts, and/or the possibility of their establishment and subsequent growth has to be prevented on the conveyor belts from the outset.

This has led, inter alia, to the development of conveyor belts provided throughout, or in individual layers, with antimicrobial additives. Antimicrobial additives here mean any of the active substances which kill microorganisms, e.g. microbes, bacteria, fungi, yeasts, viruses, etc., or inhibit their growth.

EP-B-0 818 405 discloses plastics conveyor belts which encompass a traction layer or encompass two traction layers bonded by an intermediate plastics layer, and to which a plastics layer has been laminated as conveying surface. This plastics layer comprises a composition with bis(2-pyridylthio-1-oxido)zinc as antimicrobial additive.

JP-A-4333406 discloses similarly structured food-conveyor belts in which the polymeric surface coating comprises imidazole-type additives to prevent mold.

These prior-art conveyor belts have the disadvantage that, for effective prevention of the establishment and growth of microorganisms on the conveying surface of the surface coating, relatively large amounts of antimicrobial additive have to be added in order to achieve a sufficiently high concentration, and this is firstly expensive and secondly can also have an adverse effect on the other properties of the conveyor belt.

In the light of the disadvantages of the previously known conveyor belts described above with antimicrobial additives, the invention is based on the following object: to provide a conveyor belt of the type mentioned at the outset which prevents establishment and growth of microorganisms on the conveying surface less expensively for the same effectiveness or more effectively for the same costs.

This object is achieved by the conveyor belt of the invention as defined in the appended claims.

SUMMARY

The essence of the invention is that, in a conveyor belt with a traction layer and with a polymeric surface coating which comprises an antimicrobial additive, the surface coating comprises a base layer and a functional surface layer which comprises the antimicrobial additive.

The invention is based on the realization that the antimicrobial effectiveness of a conveyor belt is primarily a surface effect. It is therefore not rational to distribute the antimicrobial additive at the same concentration over the entire thickness of the surface coating. According to the invention, therefore, the surface coating is subdivided into a base layer and a functional surface layer, and the antimicrobial additive is distributed within the functional surface layer. This makes it possible to use a smaller amount of antimicrobial additive in the region of the conveying surface to achieve an identical concentration less expensively, or to use the same amount of additive to achieve a markedly higher concentration and therefore higher effectiveness against microorganisms. Furthermore, a damaged conveying surface can be repaired, for example, using a solution, dispersion or emulsion of the antimicrobial additive.

Because no antimicrobial additive, or only a markedly lower concentration, is present in the base layer, whose purpose is to provide the surface coating with a thickness which is sufficient, for example, for damping, there is also less risk of adverse effects on certain conveyor belt properties such as stiffness, flexibility, stability, damping effectiveness, etc.

It should also be noted that the functional surface layer can also have other functions besides the antimicrobial action, for example the use of a suitable frictional surface to transport the products to be conveyed, UV resistance, any desired color, and/or an antistatic, hydrolysis-resistant, and/or dirt-repellent surface, etc. These functional properties may be achieved solely by way of the functional surface layer. The layers lying thereunder, in particular the base layer, are unaffected thereby and therefore can be better oriented toward the functions allocated to them.

The functional surface layer is preferably not thicker than the base layer. Thus, comparatively little antimicrobial additive is needed.

In one advantageous embodiment of the conveyor belt of the invention, the traction layer is a textile layer, preferably a woven textile. A textile layer generally has good tensile strength and ideal stiffness properties. Besides woven fabrics, use may also be made of nonwovens, scrims or knits, for example.

In another advantageous embodiment, the traction layer is a monolithic layer, preferably a film. A monolithic layer is normally capable of good bonding to the adjacent layers., for example by adhesive bonding or by welding.

The thickness of the base layer is advantageously at least 0.1 mm, preferably at least 0.3 mm, more preferably at least 0.5 mm. Desirable damping actions can be ensured using these minimum thicknesses.

The thickness of the functional surface layer is advantageously at most 50%, preferably at most 30%, more preferably at most 10%, of the thickness of the base layer. A relatively thin structure for the functional surface layer particularly permits the use of less additive material.

In one advantageous embodiment, between the base layer and the traction layer, a tie layer and/or at least one other polymeric layer is arranged. This additional layer or these additional layers ensure better bonding between base layer and traction layer and can affect certain conveyor belt properties, for example stiffness or potential damping.

For certain applications it is advantageous for the base layer and/or, where appropriate, the at least one other polymeric layer to comprise antimicrobial additives at a concentration lower than the concentration of the antimicrobial additive in the functional surface layer. The effectiveness of the conveyor belt against microorganisms can thus be raised.

The concentration of the antimicrobial additive in the functional surface layer is advantageously from 0.1 to 10% by weight, preferably from 1 to 5% by weight. These concentrations are the ideal concentrations for the usual antimicrobial additives in relation to antimicrobial effectiveness and stability of the functional surface layer.

The antimicrobial additive may be an organic or inorganic substance or a combination of these. It is preferably a silver zeolite, aluminum oxide, calcium oxide, or magnesium oxide, zinc pyrithione, oxybisphenoxarsine, or a combination of these. These substances are known to be efficient killers of microorganisms, or at least inhibit their growth.

In one advantageous embodiment, both the conveying side of the conveyor belt and its underside have an above-mentioned surface coating. In this way, the establishment and growth of microorganisms can be prevented on both sides of the conveyor belt.

There are various ways of producing conveyor belts of the invention. For example, the core section is first produced conventionally, and then the surface coating is produced, for example by extrusion coating or coextrusion coating, film lamination, hot melt coating or powder coating, or by a spray process or paste-spreading process. As an alternative, the surface coating may first be applied to the relevant carrier layer, and then various intermediate products can be laminated to give the final product.

The base layer is normally composed of a thermoplastic or elastomer, e.g. polyurethane, polyvinyl chloride, polyester, polyether block amide, or of a polyolefin, silicone, or rubber, or of a mixture of thermoplastics or elastomers.

The main functional surface layer is generally composed of a carrier material composed of thermoplastics, e.g. polyurethane, polyvinyl chloride, polyester, or polyolefins, within which the antimicrobial additive is arranged. The carrier material may correspond to the material of the base layer or be another material. Examples of forms in which the antimicrobial additive may be admixed with the carrier material are that of a premix or concentrate, or directly in the form of powder, pellets, or paste. If the carrier material and the antimicrobial additive are difficult to process together, the antimicrobial additive may also be prepared in the form of a solution or dispersion and applied to the previously coated surface by means of paste-spreading processes or spray processes.

Novel and advantageous over the prior art is in particular the fact that, in a first embodiment, the functional surface layer can be produced or repaired by spreading of a paste or by spraying onto the base layer.

In a second embodiment, to produce or repair the functional surface layer, polymeric carrier material is first applied to the base layer, and then an antimicrobial additive is applied to the polymeric carrier material by spreading of a paste or by spraying.

The application of the functional surface layer and, respectively, of the antimicrobial additive by means of a paste spreading process or spray process in particular permits simple repair of damaged areas on conveying surfaces.

The conveyor belt of the invention is described below in more detail with reference to the attached drawings, using five examples.

DETAILED DESCRIPTION

FIG. 1—FIRST EXAMPLE

Figure 1:
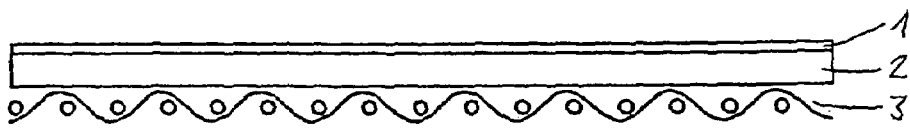
FIG. 1 shows a section of a first example of a conveyor belt of the invention with a textile traction layer and with a surface coating.
Figure 2:
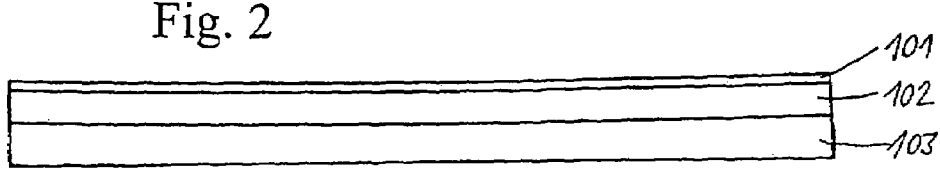
FIG. 2 shows a section of a second example of a conveyor belt of the invention with a monolithic traction layer and with a surface coating.
Figure 3:
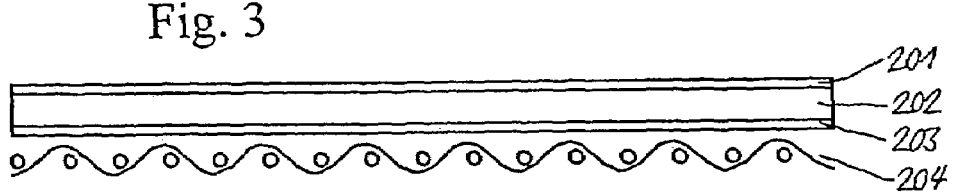
FIG. 3 shows a section of a third example of a conveyor belt of the invention with a textile traction layer, with a tie layer, and with a surface coating.
Figure 4:
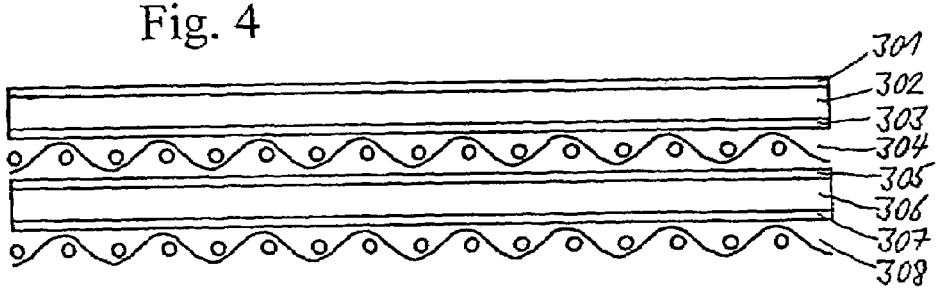
FIG. 4 shows a section of a fourth example of a conveyor belt of the invention with two textile traction layers.
Figure 5:
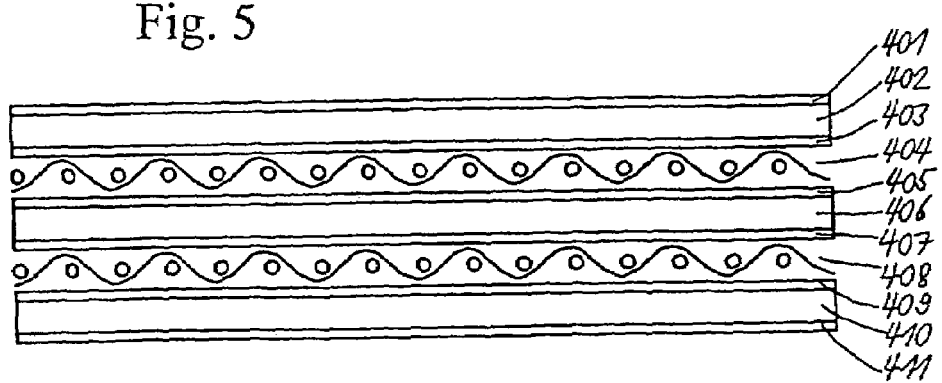
FIG. 5 shows a section of a fifth example of a conveyor belt of the invention with two textile traction layers and with a surface coating both on the conveying side and on the underside of the conveyor belt.

In this first example, the conveyor belt encompasses, as traction layer 3, a woven fabric which has been provided with a surface coating. The surface coating is composed of a base layer 2, on which a functional surface layer 1 is arranged.

The base layer 2 is here composed of polyurethane, but could also be composed of any other thermoplastic or elastomer, e.g. polyvinyl chloride, polyester, polyether block amide, or of a polyolefin, silicone, or rubber, or of a mixture of thermoplastics or elastomers. The thickness of the base layer 2 is about 0.5 mm.

A paste with antimicrobial properties has been spread onto the base layer 2 and forms the functional surface layer 1. The paste is composed mainly of an aliphatic, flexible polyurethane, dissolved in dimethylformamide. It comprises, as antimicrobial additive, zinc pyrithione at a concentration of 2% by weight, based on the solids content. To produce the paste, polyurethane pellets are dissolved in dimethylformamide solvent in a mixer. Pulverulent zinc pyrithione is then added and mixed until the zinc pyrithione has been uniformly distributed within the paste.

The paste is then applied to the base layer 2 on a spreading machine, using a doctor, in one or more spreader passes, at a particular layer thickness, e.g. 0.2 mm. After spreading, the substrate is finally dried for 2 minutes at a temperature of 120° C. in a drying tunnel. The dry layer thickness applied is 0.1 mm.

The same paste may also be used for the repair of damaged functional surface layers 1.

FIG. 2—SECOND EXAMPLE

In this second example, the conveyor belt encompasses, as traction layer 103, a monolithic layer, for example a plastics film. Monolithic layers suitable as traction layer are known to the person skilled in the art. The monolithic layer has been provided with a surface coating which here again is composed of a base layer 102, on which a functional surface layer 101 is arranged. The base layer 102 and the functional surface layer 101 correspond to the base layer 2 and, respectively, the functional surface layer 1 of the first example.

FIG. 3—THIRD EXAMPLE

In this third example, the conveyor belt encompasses, similarly to the first example, a traction layer 204 in the form of a woven fabric, and encompasses a base layer 202 and a functional surface layer 201, these substantially corresponding to the traction layer 3, the base layer 2, and, respectively, the functional surface layer 1. In order to achieve better bonding between base layer 202 and traction layer 204, an adhesion promoter forming a thin tie layer 203 is arranged between these. Suitable adhesion promoters are known to the person skilled in the art and are commercially available.

FIG. 4—FOURTH EXAMPLE

In this fourth example, the conveyor belt encompasses two traction layers 304 and 308 in the form of woven fabrics, which, together with a polymeric layer 306 arranged between these and tie layers 305 and 307, have been laminated to give a core section. The upper traction layer 304 has been provided with a surface coating formed by a base layer 302 bonded by way of a tie layer 303 to the traction layer 304 and by a functional surface layer 301 arranged thereupon. The functional surface layer 301, the base layer 302, the tie layer 303, and the traction layer 304 substantially correspond to the functional surface layer 201, the base layer 202, the tie layer 203, and, respectively, the traction layer 204 of the third example.

FIG. 5—FIFTH EXAMPLE

In this fifth example, the conveyor belt encompasses, as in the fourth example, two traction layers 404 and 408 in the form of woven fabrics which, together with a polymeric layer 406 arranged between these and tie layers 405 and 407, have been laminated to give a core section. Both the upper traction layer 404 nearer to the conveying surface and the lower traction layer 408 have been provided with a surface coating, in each case formed by a base layer 402 and, respectively, 410 bonded by way of a tie layer 403 and, respectively, 409 to the traction layer 404 and, respectively, 408 and by a functional surface layer 401 and, respectively, 411 arranged thereupon.

Other variations in the design of the conveyor belts described above are possible. The following should be expressly mentioned here:

The base layer may likewise comprise antimicrobial additive, but generally at a markedly lower concentration.

Between the base layer and the traction layer, other polymeric layers may be arranged and may in principle likewise comprise antimicrobial additive.

The antimicrobial additive used may also comprise a mixture of various active ingredients.

What is claimed is:

1. A conveyor belt comprising:
   a traction layer; and
   a surface coating;
   wherein the surface coating comprises a base layer and a functional surface layer; and wherein the functional surface layer comprises an antimicrobial additive wherein the base layer comprises an antimicrobial additive at a concentration lower than a concentration of the antimicrobial additive in the functional surface layer.

2. The conveyor belt of claim 1, wherein the surface coating comprises a polymeric material.

3. The conveyor belt of claim 1, wherein the base layer comprises a material selected from the group consisting of thermoplastics and elastomers.

4. The conveyor belt of claim 3, wherein the base layer comprises a material selected from the group consisting of polyurethane, polyvinyl chloride, polyester, polyether block amide, polyolefin, silicone, rubber, a mixture of thermoplastics or elastomers, and combinations thereof.

5. The conveyor belt of claim 1, wherein the functional surface layer further comprises a suitable frictional surface to transport the products to be conveyed, UV resistance, any desired color, and/or an antistatic, hydrolysis-resistant, and/or dirt-repellent surface.

6. The conveyor belt of claim 1, wherein the functional surface layer is thinner than the base layer.

7. The conveyor belt of claim 1, wherein the base layer has a thickness which is at least 0.1 mm.

8. The conveyor belt of claim 7, wherein the base layer has a thickness which is at least 0.3 mm.

9. The conveyor belt of claim 8, wherein the base layer has a thickness which is at least 0.5 mm.

10. The conveyor belt of claim 1, wherein a thickness of the functional surface layer is less than 50% of a thickness of the base layer.

11. The conveyor belt of claim 1, wherein a thickness of the functional surface layer is less than 30% of a thickness of the base layer.

12. The conveyor belt of claim 1, wherein a thickness of the functional surface layer is less than 10% of a thickness of the base layer.

13. The conveyor belt of claim 1, wherein the traction layer comprises a textile layer.

14. The conveyor belt of claim 13, wherein the textile layer comprises a woven textile.

15. The conveyor belt of claim 13, wherein the textile layer is selected from the group consisting of woven textiles, nonwoven textiles, scrims, knits, and combinations thereof.

16. The conveyor belt of claim 1, wherein the traction layer comprises a monolithic layer.

17. The conveyor belt of claim 16, wherein the monolithic layer comprises a film.

18. The conveyor belt of claim 1, further comprising at least one intermediate layer disposed between the base layer and the traction layer, wherein the at least one intermediate layer is selected from the group consisting of a tie layer, at least one other polymeric layer, and combinations thereof.

19. The conveyor belt of claim 1, wherein a concentration of the antimicrobial additive in the functional surface layer is in the range of 0.1 to 10% by weight.

20. The conveyor belt of claim 19, wherein the concentration of the antimicrobial additive in the functional surface layer is in the range of 1 to 5% by weight.

21. The conveyor belt of claim 1 wherein the antimicrobial additive is selected from the group consisting of silver zeolite, aluminum oxide, calcium oxide, magnesium oxide, zinc pyrithione, oxybisphenoxarsine, and mixtures thereof.

22. The conveyor belt of claim 1, wherein both a conveying side of the conveyor belt and an underside of the conveyor belt comprise a surface coating comprising a base layer and a functional surface layer, wherein the functional surface layer comprises an antimicrobial additive.

23. A conveyor belt comprising:
   a traction layer; and
   a surface coating;
   wherein the surface coating comprises a base layer and a functional surface layer; and wherein the functional surface layer comprises an antimicrobial additive at least one intermediate layer disposed between the base layer and the traction layer, wherein the at least one intermediate layer is selected from the group consisting of a tie layer, at least one other polymeric layer, and combinations thereof, wherein the at least one other intermediate layer comprises an antimicrobial additive at a concentration lower than a concentration of the antimicrobial additive in the functional surface layer.

24. A method of producing a conveyor belt comprising the steps of:
   a) providing a core section;
   b) providing a surface coating on the core section, wherein the surface coating comprises a base layer and a functional surface layer and the functional surface layer comprises an antimicrobial additive and the base layer comprises an antimicrobial additive at a concentration lower than the concentration of the antimicrobial additive in the functional surface layer.

25. The method of claim 24, wherein the functional surface layer comprises a carrier material selected from the group consisting of polyurethane, polyvinyl chloride, polyester, or polyolefins, wherein the antimicrobial additive is distributed in the carrier material.

26. The method of claim 25, wherein the antimicrobial additive is admixed with the carrier material as a premix, concentrate, directly in the form of a powder, pellets, or paste, prepared in the form of a solution or dispersion and applied to the previously coated surface by means of paste-spreading processes or spray processes.

27. The method of claim 25, wherein the carrier material is the same material as the material of the base layer.

28. The method of claim 25, wherein the carrier material is a different material than the material of the base layer.

29. The method of claim 24, wherein the step of providing a surface coating comprises at least one step selected from the group consisting of extrusion coating, coextrusion coating, film laminating, hot melt coating, powder coating, spray processing, paste-spreading processing, applying the surface coating to a carrier layer and laminating various intermediate products to give a final product, and combinations thereof.

30. The method of claim 24, wherein the base layer comprises a material selected from the group consisting of thermoplastics and elastomers.

31. The method of claim 30, wherein the base layer comprises a material selected from the group consisting of polyurethane, polyvinyl chloride, polyester, polyether block amide, polyolefin, silicone, rubber, a mixture of thermoplastics or elastomers, and combinations thereof.

32. A method of producing a conveyor belt comprising the steps of:
 a) providing a core section;
 b) providing a surface coating on the core section, wherein the surface coating comprises a base layer and a functional surface layer and the functional surface layer comprises an antimicrobial additive, wherein the step of providing a surface coating comprises first applying a polymeric carrier material to the base layer, and then applying an antimicrobial additive to the polymeric carrier material by spreading of a paste or by spraying.

* * * * *